US009924377B2

(12) United States Patent
Nishikido et al.

(10) Patent No.: US 9,924,377 B2
(45) Date of Patent: Mar. 20, 2018

(54) RADIO RELAY APPARATUS AND RADIO RELAY METHOD

(71) Applicant: KYOCERA CORPORATION, Kyoto (JP)

(72) Inventors: Masamitsu Nishikido, Kanagawa (JP); Yosuke Kajimura, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/414,006

(22) Filed: Jan. 24, 2017

(65) Prior Publication Data

US 2017/0215088 A1     Jul. 27, 2017

(30) Foreign Application Priority Data

Jan. 25, 2016   (JP) .................................. 2016-011747

(51) Int. Cl.
| | |
|---|---|
| *H04B 7/14* | (2006.01) |
| *H04W 16/28* | (2009.01) |
| *H04B 7/155* | (2006.01) |
| *H04W 24/02* | (2009.01) |

(52) U.S. Cl.
CPC .......... *H04W 16/28* (2013.01); *H04B 7/1555* (2013.01); *H04B 7/15507* (2013.01); *H04B 7/15528* (2013.01); *H04W 24/02* (2013.01)

(58) Field of Classification Search
CPC .. H04W 16/28; H04W 24/02; H04B 7/15507; H04B 7/15528; H04B 7/1555
USPC .......................................... 455/25, 63.4, 418
See application file for complete search history.

(56) References Cited

U.S. PATENT DOCUMENTS

| | | | | |
|---|---|---|---|---|
| 8,023,885 | B2 * | 9/2011 | Proctor, Jr. .......... | H04B 7/1555 455/11.1 |
| 2002/0032015 | A1 * | 3/2002 | Kitakado ................. | H04B 7/01 455/277.1 |
| 2006/0115011 | A1 * | 6/2006 | Tsuruta ................... | H04B 7/084 375/260 |
| 2010/0136900 | A1 * | 6/2010 | Seki .................... | H04B 7/15578 455/9 |
| 2010/0248659 | A1 * | 9/2010 | Kawabata ............ | H04B 7/0617 455/115.1 |
| 2011/0289312 | A1 * | 11/2011 | Tateishi .............. | H04L 63/1475 713/153 |

(Continued)

FOREIGN PATENT DOCUMENTS

| | | | |
|---|---|---|---|
| JP | 2005236426 A | * | 9/2005 |
| JP | 2007-251862 A | | 9/2007 |
| WO | 2011/096315 A1 | | 8/2011 |

*Primary Examiner* — Khai M Nguyen
(74) *Attorney, Agent, or Firm* — Studebaker & Brackett PC (57) ABSTRACT

A radio relay device includes: an antenna, which transmits and receives a radio signal with respect to a counterpart radio relay device; and a directivity controller, which adjusts directivity of the antenna, wherein the directivity controller determines whether to adjust the directivity of the antenna based on a relation between a propagation characteristic at a time when the radio signal is received from the counterpart radio relay device in an operating period and an absolute value or a relative value serving as a threshold, and when it is determined to adjust the directivity of the antenna, the directivity controller transmits an adjustment start signal to the counterpart radio relay device and adjusts the directivity of the antenna, with interlocking with the counterpart radio relay device.

6 Claims, 5 Drawing Sheets

(56) References Cited

U.S. PATENT DOCUMENTS

| | | |
|---|---|---|
| 2012/0307770 A1 | 12/2012 | Kubota |
| 2013/0039201 A1* | 2/2013 | Kwon ..................... H04L 45/22 |
| | | 370/252 |
| 2014/0295782 A1* | 10/2014 | Rousu ................. H01Q 1/3275 |
| | | 455/226.1 |
| 2016/0294451 A1* | 10/2016 | Jung ..................... H04B 17/20 |

* cited by examiner

| DEFINING OF FIRST THRESHOLD BY ABSOLUTE VALUE | | DEFINING OF FIRST THRESHOLD BY RELATIVE VALUE | |
|---|---|---|---|
| IN CASE WHERE HALF-VALUE WIDTH OF ANTENNA DIRECTIVITY IS LESS THAN 5 DEGREES | IN CASE WHERE HALF-VALUE WIDTH OF ANTENNA DIRECTIVITY IS EQUAL TO OR MORE THAN 5 DEGREES | IN CASE WHERE HALF-VALUE WIDTH OF ANTENNA DIRECTIVITY IS LESS THAN 5 DEGREES | IN CASE WHERE HALF-VALUE WIDTH OF ANTENNA DIRECTIVITY IS EQUAL TO OR MORE THAN 5 DEGREES |
| EQUAL TO OR LESS THAN -50 [dBm] | EQUAL TO OR LESS THAN -55 [dBm] | EQUAL TO OR LESS THAN ⊿-10 [dBm] | EQUAL TO OR LESS THAN ⊿-15 [dBm] |

FIG.5B

| DEFINING OF SECOND THRESHOLD BY ABSOLUTE VALUE | DEFINING OF SECOND THRESHOLD BY RELATIVE VALUE |
|---|---|
| EQUAL TO OR LESS THAN -80 [dBm] | EQUAL TO OR LESS THAN ⊿-40 [dBm] |

RADIO RELAY APPARATUS AND RADIO RELAY METHOD

CROSS-REFERENCE TO RELATED APPLICATION

This application claims priority from Japanese Patent Application No. 2016-011747 filed on Jan. 25, 2016, the entire subject matter of which is incorporated herein by reference.

TECHNICAL FIELD

This disclosure relates to a radio relay device which relays a radio signal, and a radio relay method.

BACKGROUND

As a radio communication system, there is known a system which includes a radio terminal such as a mobile phone, a base station wirelessly communicating with the radio terminal, and a backhaul device (for example, WO 2011/096315). The backhaul device establishes a backhaul system connecting the base station with an upper-level communication network (also referred to as a core network), and relays between the base station and a management server for example. In particular, the costs are increased to install optical lines in a mountainous area and a remote island, which are separated from an urban area. Therefore, a radio backhaul device and a radio backhaul system equipped therewith are used in many cases.

After the initial installation, the radio backhaul device may be deviated in its position by earthquakes or snow fall after the installation. If so, propagation characteristics of the radio backhaul device is lowered. In such a case, a service engineer is necessarily sent to that area to quickly correct the position of the radio backhaul device. However, the radio backhaul device installed in a mountainous area or a remote island separated from the urban area as described above may be hard for the service engineer to maintain. Since it also takes a lot of time until the service engineer arrives that area, there needs a lot of time for recovery. In order to care such a case, there is disclosed an antenna adjustment method in which the direction of the antennas of transmission and reception units of the radio device is adjusted based on a received signal (for example, JP 2007-251862 A).

In the radio backhaul device and the radio backhaul system equipped therewith, it needs to transmit a large quantity of user's data handled by the base station. Therefore, a significantly high transmission rate is required. For this reason, there is used a significantly high frequency such as a millimeter wave bandwidth (30 GHz bandwidth or 80 GHz bandwidth) in which a wide range of frequency bandwidth can be secured. When a high frequency such as the millimeter wave bandwidth is used, a linearity of radio waves becomes strong, and propagation strength depends largely on directivity of the antenna.

SUMMARY

As described above, the radio backhaul system performs a communication by using an antenna having a high gain and a sharp directivity and by using a radio signal of a high frequency bandwidth having a strong linearity. Therefore, a pair of radio backhaul devices are necessary to adjust the direction of the antenna in a speedy manner.

This disclosure is to provide a radio backhaul device and a radio backhaul system which can maintain a good radio service.

A radio relay device of this disclosure includes: an antenna, which transmits and receives a radio signal with respect to a counterpart radio relay device; and a directivity controller, which adjusts directivity of the antenna, and the directivity controller determines whether to adjust the directivity of the antenna based on a relation between a propagation characteristic at a time when the radio signal is received from the counterpart radio relay device in an operating period and an absolute value or a relative value serving as a threshold, and wherein when it is determined to adjust the directivity of the antenna, the directivity controller transmits an adjustment start signal to the counterpart radio relay device and adjusts the directivity of the antenna, with interlocking with the counterpart radio relay device.

A radio relay method of a radio relay device that has an antenna which transmits and receives a radio signal with respect to a counterpart radio relay device and adjusts a directivity of the antenna, the radio relay method includes determining whether to adjust the directivity of the antenna based on a relation between a propagation characteristic at a time when the radio signal is received from the counterpart radio relay device in an operating period and an absolute value or a relative value serving as a threshold, and transmitting, when it is determined to adjust the directivity of the antenna, an adjustment start signal to the counterpart radio relay device to adjust the directivity of the antenna, with interlocking with the counterpart radio relay device.

According to this disclosure, it is possible to provide a radio backhaul device and a radio backhaul system which can maintain a good radio service.

BRIEF DESCRIPTION OF THE DRAWINGS

The foregoing and additional features and characteristicss of this disclosure will become more apparent from the following detailed descriptions considered with the reference to the accompanying drawings, wherein.

SUMMARY

Hereinafter, preferred embodiments of this disclosure will be described with reference to the accompanying drawings. Dimensions, materials, and other numerical values shown in the embodiments are given as merely exemplary in order to help with understanding of this disclosure, and not limit this disclosure if not otherwise specified. In the present specification and drawings, elements having substantially the same function and configuration will be assigned with the same symbol, and a redundant description will be omitted. Elements having no immediate relationship to this disclosure will be omitted from the drawings.

Figure 1:
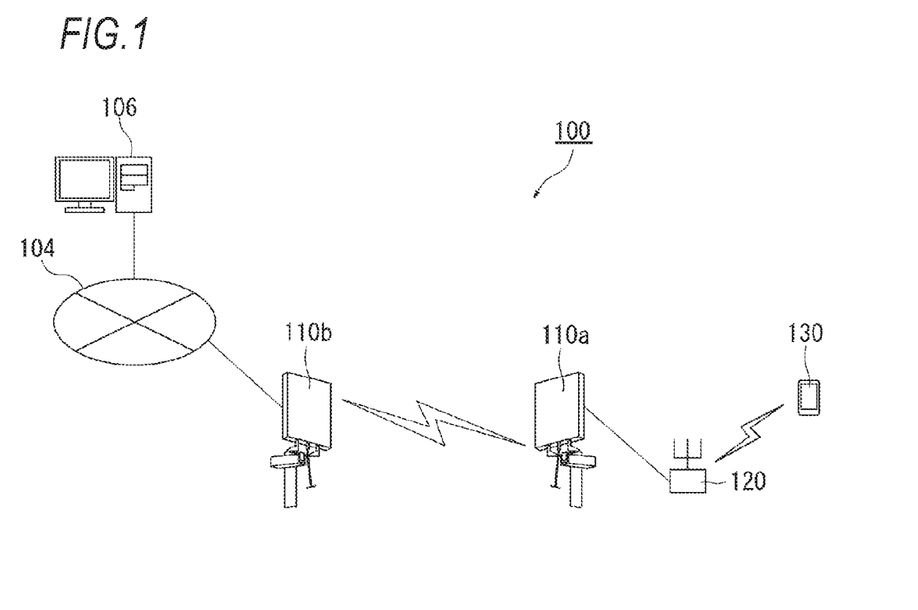
FIG. 1 is a diagram schematically illustrating a configuration of a radio backhaul system according to the embodiment.

FIG. 1 is a diagram schematically illustrating a configuration of a radio backhaul system 100 according to the embodiment. As illustrated in FIG. 1, the radio backhaul system 100 according to this embodiment is configured to include a pair of radio backhaul devices 110a and 110b (a radio relay device and a counterpart radio relay device) which connect a base station 120 to a communication network 104.

In the pair of radio backhaul devices 110a and 110b, the radio backhaul device 110a is connected to the base station 120, and the radio backhaul device 110b is connected to a server 106 through the communication network 104. According to this configuration, a terminal 130 communicating with the base station 120 is connected to the communication network 104 through the pair of radio backhaul devices 110a, and 110b.

Figure 2:
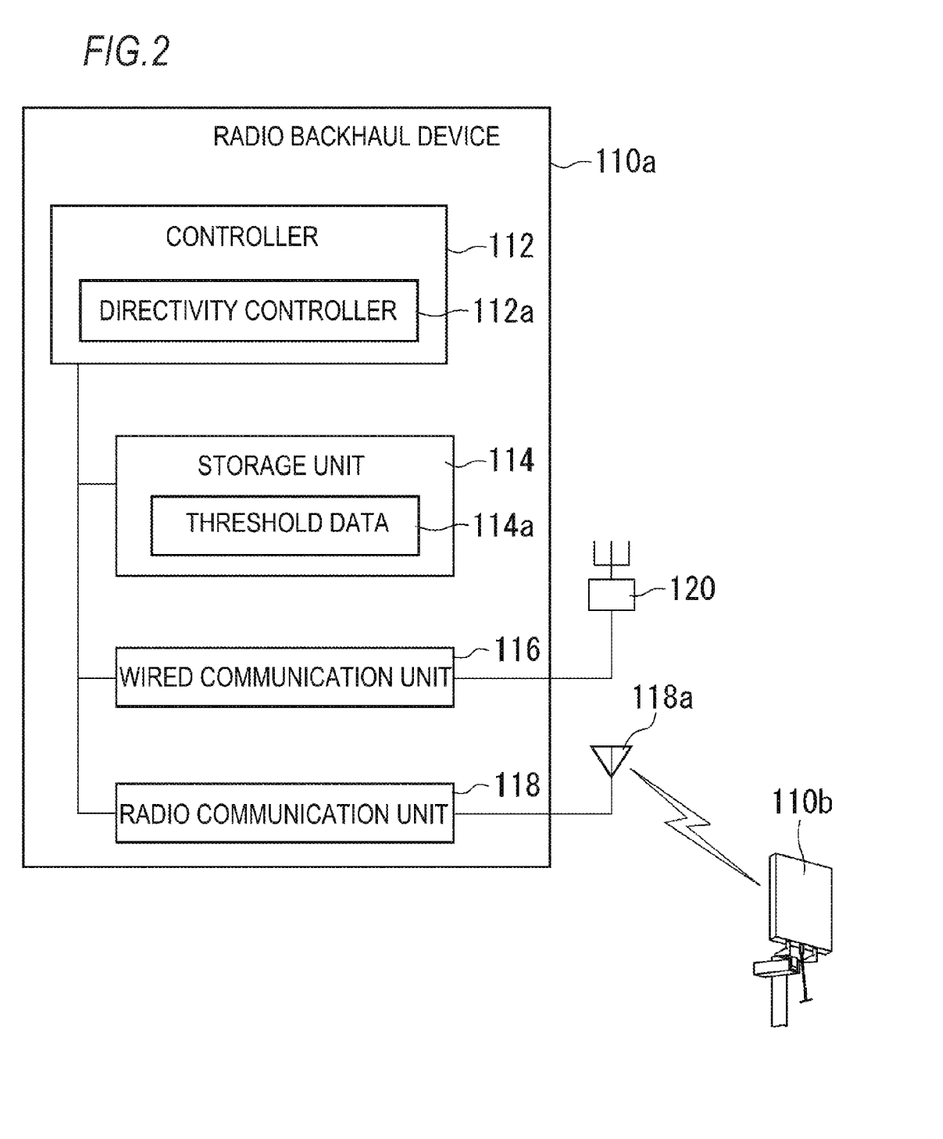
FIG. 2 is a functional block diagram schematically illustrating a configuration of a radio backhaul device according to the embodiment.

FIG. 2 is a functional block diagram schematically illustrating a configuration of the radio backhaul device 110a according to this embodiment. In this embodiment, the pair of radio backhaul devices 110a and 110b have the same configuration, and thus only the radio backhaul device 110a is illustrated in FIG. 2.

As illustrated in FIG. 2, the radio backhaul device 110a of this embodiment is configured to include a controller 112, a storage unit 114, a wired communication unit 116, a radio communication unit 118, and an antenna 118a. The controller 112 is configured by a semiconductor integrated circuit (not illustrated) containing a central processing unit (CPU), and manages and controls the entire radio backhaul device 110a. In this embodiment, the controller 112 also serves as a directivity controller 112a which adjusts the directivity of the antenna 118a.

The directivity controller 112a performs a directivity control of the antenna such that a device which notifies an adjustment start signal for the adjustment of the directivity is interlocked with a device which is notified the adjustment start signal, a variable directivity antenna is controlled, and a reception power calculated by a reception power calculation unit in the radio backhaul device becomes the largest value (maximum).

The storage unit 114 is configured by a ROM, a RAM, an EEPROM, a non-volatile RAM, a flash memory, and an HDD, and is used to store a program to be processed by the controller 112. In this embodiment, the storage unit 114 stores threshold data 114a which is threshold data of propagation characteristics described below.

The wired communication unit 116 is connected to the base station 120 in a wired manner, and transmits/receives a packet with respect to the base station 120. The radio communication unit 118 is connected to the antenna 118a through which a transmission and a reception of a radio signal in a high-frequency band having a strong linearity is performed, and communicates with the radio backhaul device 110b in a pair through the antenna 118a. In the radio backhaul device 110b, the wired communication unit 116 is connected to the communication network 104 in a wired manner, not the base station 120.

(First Example)

Figure 3:
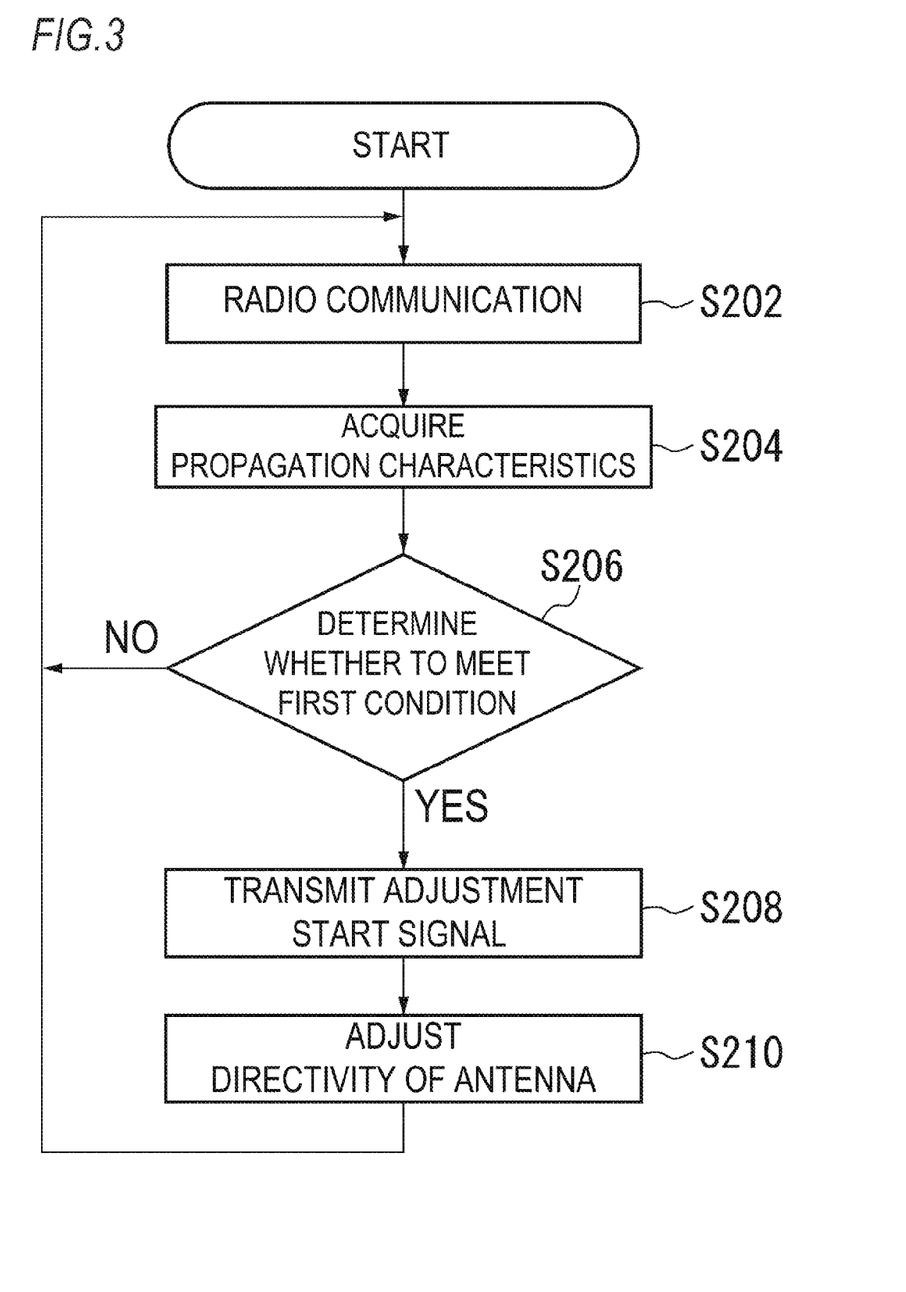
FIG. 3 is a flowchart illustrating a first example of an operation of the radio backhaul system of the embodiment.

FIG. 3 is a flowchart illustrating a first example of an operation of the radio backhaul system 100 of this embodiment, in which the operation of the radio backhaul device 110a is mainly illustrated. As illustrated in FIG. 3, in the radio backhaul system 100 of this embodiment, the controller 112 of the radio backhaul device 110a wirelessly communicates with the radio backhaul device 110b paired up therewith (Step S202). Meanwhile, the controller of the radio backhaul device 110a acquires the propagation characteristics in the radio communication (Step S204). As the propagation characteristics, there may be a reception power value (RSSI), for example, at the time when a signal is received from the radio backhaul device 110b.

In the radio backhaul system 100 of this embodiment, a threshold (hereinafter, referred to as a first threshold) is set with respect to the above-described propagation characteristics, and the first threshold is stored in the threshold data 114a of the storage unit 114. Such a threshold is a value used by the radio backhaul device 110 to determine whether to adjust the antenna.

Figure 5A:
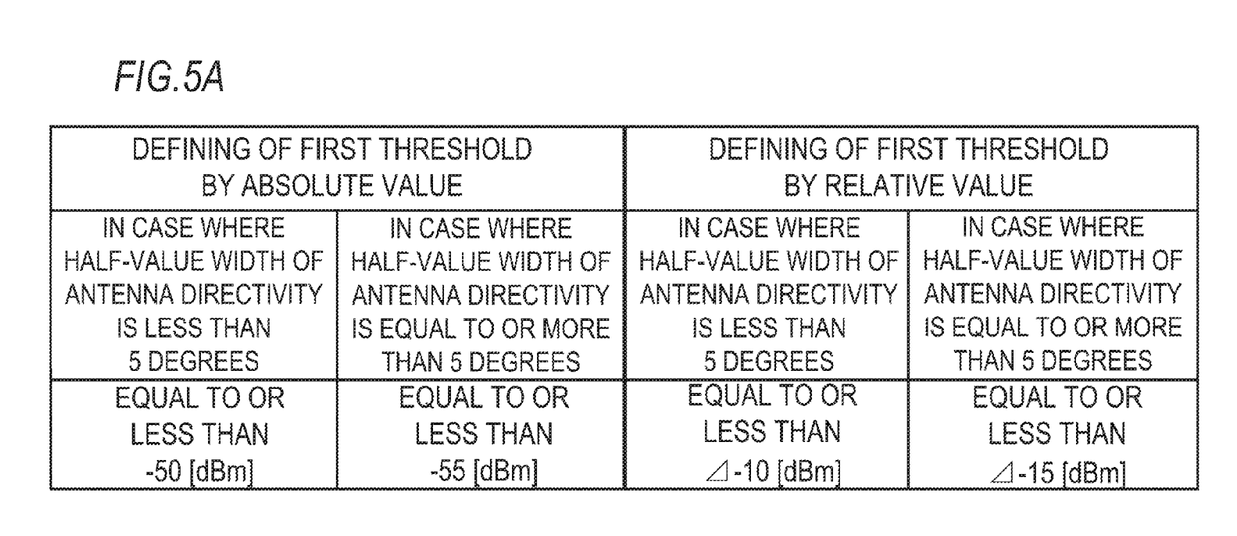
FIGS. 5A and 5B are diagrams illustrating a condition for transmitting an alignment packet.
Figure 5B:
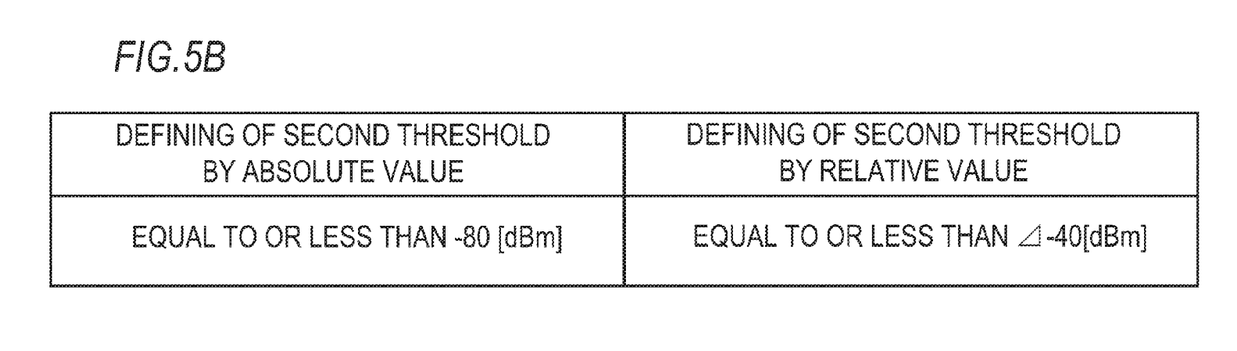

FIGS. 5A and 5B are diagrams illustrating a condition for transmitting an alignment packet. The thresholds shown in FIGS. 5A and 5B are given as exemplary. FIG. 5A is a diagram illustrating a first condition and illustrates a relation, for transmitting an alignment packet, between the first threshold and the propagation characteristics.

In FIGS. 5A and 5B, a state where a half-value width (angle) of a beam of the radio signal is less than 5 [degree] indicates that the directivity of the antenna is sharp. A state where the half-value width is equal to or more than 5 [degree] indicates that the directivity of the antenna is dull. In the first threshold, an absolute value and a relative value are defined. In FIG. 5A, in a case where the half-value width is less than 5 [degree], the first threshold as an absolute value is set to −50 [dbm], and in a case where the half-value width is equal to or more than 5 [degree], the first threshold as the absolute value is set to −55 [dbm]. Meanwhile, the first threshold as a relative value of is set to −10 [dbm], and in a case where the half-value width is equal to or more than 5 [degree], and the first threshold of as the absolute value is set to −15 [dbm]. A second threshold of FIG. 5B will be described below.

When the absolute value of the first threshold is used, the propagation characteristics currently acquired according to the half-value width of the antenna directivity is compared to the absolute value of the first threshold. In a case where the directivity is sharp, the absolute value of the first threshold can be set to be high. In a case where the directivity is dull, the absolute value of the first threshold can be set to be low. This is because a gain is steeply lowered when the deviation of the antenna is large in a case where the directivity of the antenna is sharp.

Even when the relative value of the first threshold is used, a value based on the propagation characteristics currently acquired according to the half-value width of the antenna directivity is compared to the relative value of the first threshold. Even in this case, the relative value of the first threshold can be set to be high in a case where the directivity is sharp. The relative value of the first threshold can be set to be low in a case where the directivity is dull.

For example, when the relative value of the first threshold is compared, the relative value of the propagation characteristics currently acquired from an average propagation characteristics in a predetermined period (for example, the last one month in an operating period) is compared to the relative value of the first threshold. The relative value of the first threshold is an allowable relative value and, for example, corresponds to value difference from a reference value which is based on a proper reception power value at the time when the radio backhaul device 110b is installed, Herein, the controller 112 serves as the directivity controller 112a, and determines whether the propagation characteristics acquired in Step S204 meets the condition for transmitting the alignment packet by using the first threshold, with reference to the threshold data 114a stored in the storage unit 114 (Step S206).

In a case where the propagation characteristics meets the first condition (YES in Step S206), that is, when the propagation characteristics is lower than the first threshold (lower than any one of the absolute value of the first threshold and the relative value of the first threshold), the directivity controller 112a transmits the adjustment start signal (alignment packet) for adjusting the directivity to the radio backhaul device (communication party) 110b (Step S208). At this time, the adjustment start signal is transmitted not to influence data communication between users. The directivity controller 112a adjusts the directivity of the antenna 118a of the radio backhaul device 110a, with interlocking with the device to which the adjustment start signal is notified (Step S210).

In a case where the propagation characteristics does not meet the first condition (NO in Step S206), the controller 112 acquires the propagation characteristics while maintaining the communication with the radio backhaul device 110b, and repeatedly performs Steps S202 to S206.

In the radio backhaul system 100 of this embodiment, the directivity of the antenna is also adjusted in the radio backhaul device 110b which receives the adjustment start signal from the radio backhaul device 110a at this time.

As a method of applying the first threshold, only the comparison with the relative value of the first threshold or only the comparison with the absolute value of the first threshold may be performed in S206. In S206, the absolute value of the first threshold may be compared after the comparison with the relative value of the first threshold, or the relative value of the first threshold may be compared after the comparison with the absolute value of the first threshold.

The directivity of the antenna 118a may be adjusted mechanically and electrically for example. As a mechanical adjustment, the directivity controller 112a mechanically adjusts an angle of the antenna 118a by using a rack and a pinion, a worm gear, and a stepping motor. On the other hand, as an electrical adjustment, the directivity controller 112a adjusts an angle of the beam by controlling weight values (amplitude and phase) in a plurality of antenna elements in a case where the antenna 118a of the radio backhaul device 110a is configured by the plurality of antenna elements.

After the directivity of the antenna 118a is adjusted, the controller 112 communicates with the radio backhaul device 110b to acquire the propagation characteristics again. Trials of adjusting the directivity is performed for directions of up and down, and right and left, respectively. For example, if the propagation characteristics is improved in a case where the antenna is turned to the right, the antenna is further turned to the right. If the propagation characteristics is lowered, the antenna is turned to the opposite direction (left). Trials in directions of up and down are similarly performed. In this way, the direction of the antenna in which the propagation characteristics is improved is searched. The directivity controller 112a determines whether the propagation characteristics is equal to or more than the first threshold (Step S206), and repeatedly performs the processes in Steps S208 to S210 until the propagation characteristics is equal to or more than the first threshold.

As described above, according to the radio backhaul system 100 of this embodiment, the pair of radio backhaul devices 110a and 110b can automatically adjust the directivity of the antenna 118a even in a case where the positions of the radio backhaul devices 110a and 110b are deviated after initial installation due to earthquakes, snow fall and the like. Therefore, it is possible to maintain a good radio service without sending a service engineer.

(Second Example)

As a feature of a second example, it is assumed a case where the directivity of the antenna is largely deviated, and a significant degradation occurs in the propagation characteristics.

Figure 4:
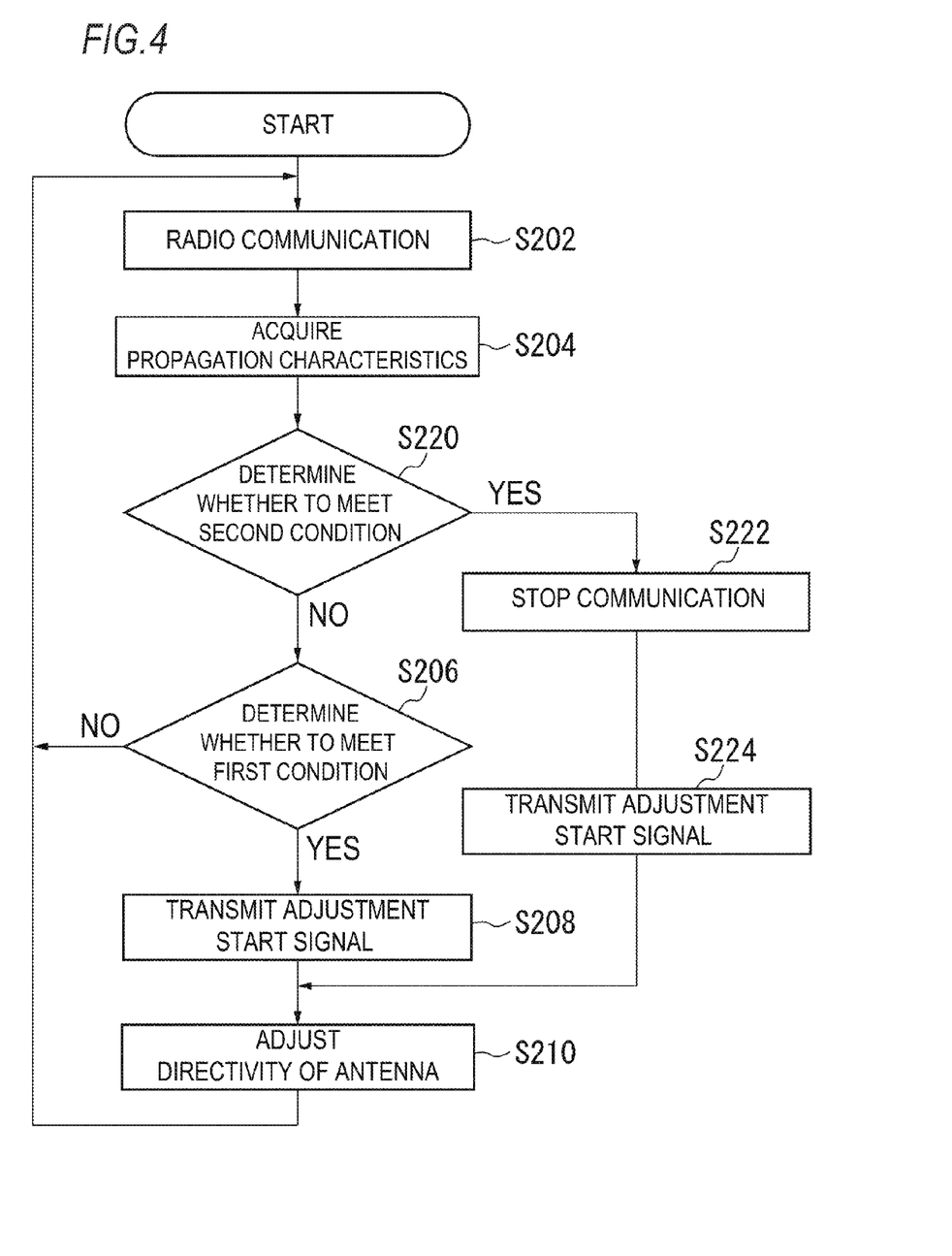
FIG. 4 is a flowchart illustrating a second example of an operation of the radio backhaul system of the embodiment.

FIG. 4 is a flowchart illustrating the second example of an operation of the radio backhaul system 100 of this embodiment, in which the operation of the radio backhaul device 110a is mainly illustrated similarly to FIG. 3. The description on the processes common to the first example will be omitted from the description of the second example.

The threshold data 114a of the storage unit 114 is set with the second threshold lower than the threshold (the first threshold) used in the first example. In other words, it is assumed a case where the directivity of the antenna is largely deviated and the propagation characteristics is significantly degraded. Similarly to the first threshold, a preset absolute value or a relative value with respect to a predetermined period in an operating period may be used as the second threshold.

As illustrated in FIG. 4, in the second example, the directivity controller 112a of the radio backhaul device 110a determines whether meets the condition for transmitting the alignment packet by using the second threshold (Step S220).

FIG. 5B is a diagram illustrating a second condition and illustrates a relation, for transmitting an alignment packet, between the second threshold and the propagation characteristics. In a case where the absolute value is defined, the second threshold is set to be lower than the threshold (the first threshold) used in the first example. In this way, the second threshold lower than the threshold (the first threshold) used in the first example is set. In other words, it is assumed a case where the directivity of the antenna is largely deviated and the propagation characteristics is significantly degraded. Similarly to the first threshold, a preset absolute value or a relative value with respect to the predetermined period in an operating period may be used as the second threshold. In FIG. 5B, the second threshold as an absolute value is set to −80 [dbm], and the second threshold as the relative value is set to −40 [dbm].

In a case where the propagation characteristics does not meet the second condition (NO in Step S220), that is, in a case where there is no significantly large deviation, the directivity controller 112a determines whether the propagation characteristics is equal to or more than the first threshold (Step S206), and performs the same process as that of the first example.

On the other hand, when the propagation characteristics meets the second condition (YES in Step S220), that is, in a case where there is a large deviation, the directivity controller 112a stops the data communication with the radio backhaul device (the communication party) 110b for a quick recovery (Step S222). In this case, the data communication or the like between users is stopped. However, the transmission/reception of the signal related to the directivity adjustment performed by the radio backhaul devices 110a and 110b is not stopped, and the adjustment start signal (alignment packet) is transmitted (Step S224). After the data communication is stopped, the directivity controller 112a adjusts the directivity of the antenna 118a (Step S210). In this case, the directivity of the antenna may be roughly adjusted to return to an initial state at the time of installing the antenna.

Hitherto, according to the configuration of the second example, the first threshold is a value used to determine whether a certain degree of reduction occurs in the propagation characteristics of the communication between the radio backhaul devices 110a and 110b. The second threshold is a value used to determine whether a significant degradation occurs in the propagation characteristics of the communication. In a case where the propagation characteristics is lower than the second threshold, the communication is once stopped. Therefore, while preventing a communication delay in a degraded communication situation, the directivity of the antenna 118a can be quickly adjusted.

As another example, in the first threshold of FIGS. 5A and 5B, as the half-value width of the antenna becomes narrower, the direction of the antenna 118a is necessarily controlled with more accuracy. Therefore, the first threshold may be set to variable, and as the half-value width is smaller, the first threshold may be set to be larger. The first threshold may be set to variable, and as the half-value width is larger, the first threshold may be set to be smaller. Then, the radio backhaul devices 110a and 110b can adjust the directivity of the antenna 118a at a stage before the propagation characteristics is steeply lowered.

Hitherto, the preferred embodiments of this disclosure have been described with reference to the accompanying drawings, but it is a matter of course that this disclosure is not limited to these examples. A person skilled in the art can easily conceive various changes or modifications within a range of claims. It can be understood that also these changes and modifications are deservedly belonging to a technical scope of this disclosure.

This disclosure can be used in a radio backhaul device to connect a base station to a communication network and a radio backhaul system which includes a pair of radio backhaul devices.

What is claimed is:

1. A radio relay device, comprising:
   a first antenna, which transmits and receives a radio signal with respect to a counterpart radio relay device; and
   a directivity controller, which adjusts directivity of the first antenna,
   wherein the directivity controller determines whether to adjust the directivity of the first antenna based on a relation between a propagation characteristic at a time when the radio signal is received from the counterpart radio relay device in an operating period and an absolute value or a relative value serving as a threshold, and
   wherein when it is determined to adjust the directivity of the first antenna, the directivity controller transmits an adjustment start signal to the counterpart radio relay device and adjusts the directivity of the first antenna, with interlocking with the counterpart radio relay device, so as to accordingly adjust a directivity of a second antenna of the counterpart radio relay device.

2. The radio relay device according to claim 1,
   wherein the threshold is set according to a range of a half-value width of a beam of the radio signal.

3. The radio relay device according to claim 2,
   wherein the directivity controller sets the threshold to be lower as the half-value width is increased, and to be higher as the half-value width is decreased.

4. The radio relay device according to claim 1,
   wherein when the propagation characteristic is lower than the threshold, the directivity controller transmits an adjustment start signal to adjust the directivity of the first antenna to a radio relay device that is a communication party.

5. The radio relay device according to claim 1,
   wherein when the propagation characteristic is less than a second threshold lower than the threshold, the directivity controller adjusts the directivity of the first antenna after the communication with the counterpart radio relay device is stopped.

6. A radio relay method of a radio relay device that has a first antenna which transmits and receives a radio signal with respect to a counterpart radio relay device and adjusts a directivity of the first antenna, the radio relay method comprising:
   determining whether to adjust the directivity of the first antenna based on a relation between a propagation characteristic at a time when the radio signal is received from the counterpart radio relay device in an operating period and an absolute value or a relative value serving as a threshold, and
   transmitting, when it is determined to adjust the directivity of the first antenna, an adjustment start signal to the counterpart radio relay device to adjust the directivity of the first antenna, with interlocking with the counterpart radio relay device, so as to accordingly adjust a directivity of a second antenna of the counterpart radio relay device.

* * * * *